United States Patent
Rajala et al.

(10) Patent No.: US 8,620,126 B2
(45) Date of Patent: Dec. 31, 2013

(54) OPTICAL FIBER STRUCTURE AND A METHOD OF PRODUCING THEREOF

(75) Inventors: Markku Rajala, Vantaa (FI); Mircea Hotoleanu, Cluj-Naposa (RO); Per Stenius, Espoo (FI); Harri Valkonen, Rühimaki (FI); Simo Tammela, Espoo (FI); Pauli Kiiveri, Kirkkonummi (FI)

(73) Assignee: nLight Oy, Lohja (FI)

( * ) Notice: Subject to any disclaimer, the term of this patent is extended or adjusted under 35 U.S.C. 154(b) by 761 days.

(21) Appl. No.: 12/531,373

(22) PCT Filed: Mar. 17, 2008

(86) PCT No.: PCT/FI2008/050121
§ 371 (c)(1),
(2), (4) Date: Apr. 22, 2010

(87) PCT Pub. No.: WO2008/110668
PCT Pub. Date: Sep. 18, 2008

(65) Prior Publication Data
US 2010/0220965 A1    Sep. 2, 2010

Related U.S. Application Data

(60) Provisional application No. 60/918,034, filed on Mar. 15, 2007.

(51) Int. Cl.
G02B 6/02    (2006.01)
(52) U.S. Cl.
USPC .......................................................... 385/127
(58) Field of Classification Search
None
See application file for complete search history.

(56) References Cited

U.S. PATENT DOCUMENTS

| 4,184,744 | A | 1/1980 | Onoda et al. |
| 4,974,932 | A | 12/1990 | Nattermann et al. |
| 5,491,581 | A | 2/1996 | Roba |
| 5,841,926 | A | 11/1998 | Takeuchi et al. |
| 5,883,990 | A | 3/1999 | Sasaoka et al. |
| 5,892,615 | A | 4/1999 | Grubb et al. |

(Continued)

FOREIGN PATENT DOCUMENTS

| EP | 0556580 A1 | 8/1993 |
| JP | 52-058547 A | 5/1977 |

(Continued)

OTHER PUBLICATIONS

Tammela et al.; "The Potential of Direct Nanoparticle Deposition for the Next Generation of Optical Fibers"; Proceedings of SPIE, vol. 6116, 61160G; 2006; entire document.

(Continued)

*Primary Examiner* — Sarah Hahm
(74) *Attorney, Agent, or Firm* — Venable LLP; Eric J. Franklin

(57) ABSTRACT

An optical waveguide including a core, a buffer surrounding the core, and a cladding surrounding the buffer. The core, the buffer and the cladding include silica glass. A refractive index of the buffer is substantially equal to a refractive index of pure amorphous silica glass. The buffer may reduce bubble formation during manufacturing and may facilitate splicing of the waveguide. A numerical aperture of the waveguide may be fine-tuned by adjusting a radial dimension of the buffer in order to compensate variations in the refractive index of the core.

24 Claims, 6 Drawing Sheets

(56) References Cited

U.S. PATENT DOCUMENTS

| | | | |
|---|---|---|---|
| 6,072,929 | A | 6/2000 | Kato et al. |
| 6,131,414 | A * | 10/2000 | Shimizu et al. ............. 65/378 |
| 6,795,628 | B2 | 9/2004 | Shibuta |
| 6,823,122 | B2 | 11/2004 | Collier et al. |
| 7,076,139 | B1 * | 7/2006 | Aikawa et al. ............. 385/123 |
| 7,233,727 | B2 | 6/2007 | Hirano et al. |
| 7,283,714 | B1 | 10/2007 | Gapontsev et al. |
| 2002/0106172 | A1 | 8/2002 | Kato et al. |
| 2002/0159731 | A1 | 10/2002 | Grunner-Nielsen et al. |
| 2003/0108318 | A1 | 6/2003 | Arai et al. |
| 2003/0118304 | A1 | 6/2003 | Shibuta |
| 2007/0047962 | A1 | 3/2007 | Hirano et al. |
| 2007/0147754 | A1 * | 6/2007 | Chiang et al. ............. 385/123 |

FOREIGN PATENT DOCUMENTS

| | | |
|---|---|---|
| JP | 56-052706 | 5/1981 |
| JP | 56062706 | 12/1981 |
| JP | 2003-156649 A | 5/2003 |
| JP | 2007-017907 A | 1/2007 |
| WO | WO-02/075393 A1 | 9/2002 |
| WO | WO-2006/017802 A2 | 2/2006 |

OTHER PUBLICATIONS

PCT/ISA/210—International Search Report—Jun. 17, 2008.

PCT/IPEA/409—International Preliminary Report on Patentability—May 12, 2009.

European Patent Office Search Report, dated Jul. 22, 2011, issued in connection with counterpart European Application No. EP 08 73 6770.

Yin, Shizhuo, et al., "A new design for non-zero dispersion-shifted fiber (NZ-DSF) with a large effective area over 100 μm2 and low bending and splice loss", *Optics Communications* 177, pp. 225-232, Apr. 15, 2000.

Laperle, Pierre, et al., "Yb-Doped LMA Triple-Clad Fiber for Power Amplifiers", *Proceedings of the SPIE—The international society for optical engineering, fiber lasers IV: technology, systems and applications*, vol. 6453, Jan. 22, 2007.

Voiculescu, Emil, et al., "Improving the beam quality in LMA fibers," *Proceedings of the SPIE—The international society for optical engineering—devices, materials, and technologies XII*, vol. 6896, Jan. 21, 2008.

Notification of Reason for Refusal—Issued by Japan Patent Office in Counterpart Application on May 7, 2013.

* cited by examiner

OPTICAL FIBER STRUCTURE AND A METHOD OF PRODUCING THEREOF

CROSS-REFERENCE TO RELATED APPLICATIONS

This application claims priority to U.S. provisional patent application 60/918,034 filed 15 Mar. 2007 and is the national phase under 35 U.S.C. §371 of PCT/FI2007/050121 filed 17 Mar. 2008.

FIELD OF THE INVENTION

The present invention relates to optical fibers, and to methods for manufacturing thereof.

BACKGROUND

Optical systems, amplifiers, or lasers based on large mode area (LMA) fibers may require a good beam quality. The beam quality provided by a light-amplifying optical fiber may be improved by selecting a low numerical aperture (NA), which does not support propagation of high order modes.

It is known that the numerical aperture of a fiber may be reduced by increasing the refractive index of the cladding.

Manufacturing of a large mode area fiber requires tight control of the numerical aperture. A manufacturing process, e.g. core deposition does not always allow accurate control of the refractive index, and there may be variations in the numerical aperture of the resulting fiber. Thus, there may be excessive variations in the numerical aperture of the manufactured fibers. In some cases the numerical aperture may accidentally be too low.

U.S. Pat. No. 6,823,122 discloses light-amplifying fiber which has an inner cladding portion and an outer cladding portion. The refractive index of the inner cladding portion may be reduced e.g. through fluorine and boron doping in order to implement a desired refractive index profile.

SUMMARY

An object of the invention is to provide an optical fiber structure. another object of the invention is to provide a method of manufacturing a optical fiber structure. A further object of the invention is to provide a preform for manufacturing a an optical fiber.

According to a first aspect of the invention, there is provided an optical waveguide comprising,
 a core,
 a buffer surrounding said core, and
 a cladding surrounding said buffer,
said core, said buffer and said cladding comprising silica glass, and the refractive index of said buffer being substantially equal to the refractive index of pure amorphous silica glass.

The optical waveguide may be light-amplifying.

According to a second aspect of the invention, there is provided a method for producing an optical waveguide, said optical waveguide comprising
 a core,
 a buffer surrounding said core, and
 a cladding surrounding said buffer,
said core, said buffer and said cladding comprising silica glass, and the refractive index of said buffer being substantially equal to the refractive index of pure amorphous silica glass,
said method comprising:
 adjusting the radial dimension of said buffer so as to tune the cut-off wavelength $\lambda_C$ of single mode operation of said optical waveguide to a predetermined value.

According to a third aspect of the invention, there is provided a method for producing an optical waveguide, said optical waveguide comprising
 a core,
 a buffer surrounding said core, and
 a cladding surrounding said buffer,
said core, said buffer and said cladding comprising silica glass, and the refractive index of said buffer being substantially equal to the refractive index of pure amorphous silica glass,
said method comprising:
 adjusting the radial dimension of said buffer so as to attain a predetermined numerical aperture of said optical waveguide.

According to a fourth aspect of the invention, there is provided a method for producing an optical waveguide, said optical waveguide comprising
 a core,
 a buffer surrounding said core, and
 a cladding surrounding said buffer,
said core, said buffer and said cladding comprising silica glass, and the refractive index of said buffer being smaller than or equal to the refractive index of pure amorphous silica glass,
said method comprising:
 adjusting the radial dimension of said buffer so as to tune the cut-off wavelength $\lambda_C$ of single mode operation of said optical waveguide to a predetermined value.

According to a fifth aspect of the invention there is provided a method for producing an optical waveguide, said optical waveguide comprising
 a core,
 a buffer surrounding said core, and
 a cladding surrounding said buffer,
said core, said buffer and said cladding comprising silica glass, and the refractive index of said buffer being smaller than or equal to the refractive index of pure amorphous silica glass,
said method comprising:
 adjusting the radial dimension of said buffer so as to attain a predetermined numerical aperture of said optical waveguide.

According to a sixth aspect of the invention there is provided a method for producing a preform of an optical waveguide, said method comprising:
 providing a rod,
 coating said rod with a first glass layer such that said first glass layer surrounds said rod, and
 coating said first glass layer with a second glass layer such that said second glass layer surrounds said first glass layer,
wherein said rod, said first glass layer, and said second glass layer comprise silica glass,
the refractive index of said first glass layer being substantially equal to the refractive index of pure amorphous silica glass.

According to a seventh aspect of the invention, there is provided a method of producing an optical waveguide by drawing from a preform, the method of producing an optical waveguide further comprising adjusting the radial dimension of the buffer of the waveguide so as to tune the cut-off wavelength $\lambda_C$ of single mode operation of said optical waveguide to a predetermined value.

According to an eighth aspect of the invention, there is provided a method of producing an optical waveguide by drawing from a preform, the method of producing an optical waveguide further comprising adjusting the radial dimension of the buffer of the waveguide so as to attain a predetermined numerical aperture of said optical waveguide.

A large mode area (LMA) fiber having a low numerical aperture (NA) may be manufactured by implementing a thin buffer layer of pure silica glass between the core and the cladding of the fiber. The buffer layer eliminates a direct contact between glasses having different dopants or a different amount of dopants.

Thanks to the use of the buffer, light-amplifying fibers having a low numerical aperture may be manufactured.

Thanks to the use of the buffer, there is more freedom to select the refractive index of the core and the refractive index of the cladding during manufacturing.

Thanks to the use of the buffer, an allowable tolerance margin of the refractive index of the core and the refractive index of the cladding may be wider than without the buffer. The radial dimension of the buffer may be selected to correspond to the refractive index of the core and/or the refractive index of the cladding in order to implement a desired numerical aperture. In other words, the numerical aperture may be tuned by selecting the radial dimension of the buffer.

Thanks to the use of the buffer, splicing of the buffered fiber to other fibers or waveguides may be facilitated.

The optical materials may be doped in order to adjust the refractive index and/or to implement light-amplifying properties. The use of the buffer may facilitate manufacturing of a light-amplifying fiber having a very high dopant concentration in the core, while still providing a low numerical aperture (NA).

The dopants are typically volatile, and the sleeving process may generate bubbles in the doped materials. The buffer layer may reduce the risk of bubbling in the core and/or cladding. Thus, thanks to the use of the buffer, the manufacturing yield of fibers may be substantially increased.

The radial and axial variations of the refractive index in the buffer are substantially eliminated and more consistent quality may be achieved. Yet, the number of different dopants required in the manufacturing process may be reduced.

The embodiments of the invention and their benefits will become more apparent to a person skilled in the art through the description and examples given herein below.

BRIEF DESCRIPTION OF THE FIGURES

In the following examples, the embodiments of the invention will be described in more detail with reference to the appended drawings, in which.

DETAILED DESCRIPTION

Figure 1A:
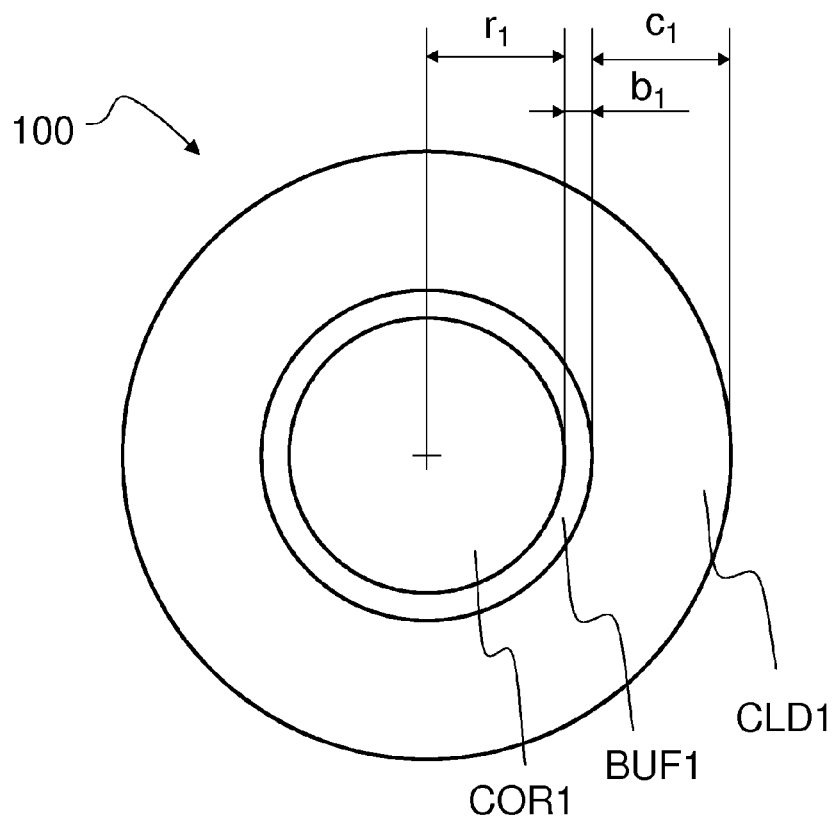
FIG. 1a shows, in a schematic cross-sectional end view, a buffered optical fiber.

Referring to FIG. 1a, a light-amplifying buffered optical fiber 100 comprises a core COR1, a buffer BUF1, and a cladding CLD1. The buffer BUF1 has an annular shape and it surrounds the core COR1. the cladding CLD1 has also an annular shape and it surrounds the buffer BUF1. The core COR1 has a radius $r_1$. The buffer has a radial dimension $b_1$. The cladding has a radial dimension $c_1$.

The buffered fiber 100 may be a large mode area (LMA) fiber so that the effective mode area is greater than or equal to 200 $\mu m^2$. The buffered fiber 100 may be dimensioned to be a single mode fiber, or to support only 2-4 transverse modes.

Figure 1B:
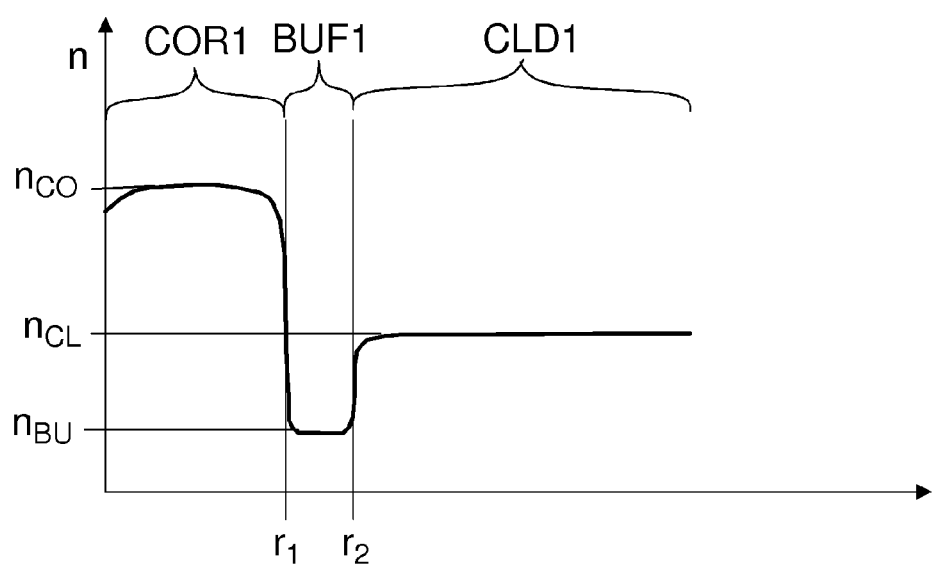
FIG. 1b shows schematically a radial refractive index profile of a buffered fiber.

Referring to FIG. 1b, the refractive index $n_{CO}$ of the core COR1 is greater than the refractive index $n_{CL}$ of the cladding CLD1 in order to confine waveguided light to the core COR1.

The refractive index $n_{CL}$ of the cladding CLD1 may be selected to implement a desired numerical aperture NA of the fiber 100. A small numerical aperture NA may facilitate suppressing the propagation of high order modes in the fiber 100, in particular when the fiber has a large mode area. Suppressing of the high order modes may facilitate improving the beam quality.

The refractive index $n_{CO}$ of the core COR1 and/or the refractive index $n_{CL}$ of the cladding CLD1 may be increased by doping with e.g. germanium oxide ($GeO_2$), phosphorus oxide ($P_2O_5$), and/or aluminium oxide ($Al_2O_3$).

The radial dimension $b_1$ of the buffer and the refractive index difference $n_{CO}-n_{CL}$ may be selected to implement a numerical aperture NA which is e.g. in the range of 0.05 to 0.065.

The refractive index $n_{BU}$ of the buffer BUF1 is lower than the refractive indices $n_{CO}$ and $n_{CL}$. The buffer BUF1 may consist of substantially pure amorphous silica. Thus, the refractive index $n_{BU}$ of the buffer BUF1 may be substantially equal to the refractive index of undoped silica.

The refractive index of silica depends on the wavelength. For ultraviolet grade silica and full spectrum grade fused silica, the refractive index is in the range of 1.438 to 1.551 when the wavelength is in the range of 0.2 to 2 $\mu m$.

The variation of the refractive index between core COR1, buffer BUF1 and cladding CLD1 may be step-wise or gradual. The radius r1 of the core COR1 is defined by the mid-way, i.e. the average between the maximum refractive index of the core reg and the minimum refractive index of the first cladding region CR1. The second radius R2 is defined by the mid-way between the minimum refractive index of the core region CR0 and the maximum refractive index of the second cladding region CR2.

The radius $r_1$ of the core COR1 may be e.g. substantially equal to 10 $\mu m$. The radial dimension b1 of the buffer may be e.g. substantially equal to 2 $\mu m$. The radial dimension $c_1$ of the cladding CLD1 may be e.g. greater than 5 μm. The outer radius $r_2$ of the buffer is equal to $r_1+b_1$.

Figure 2A:
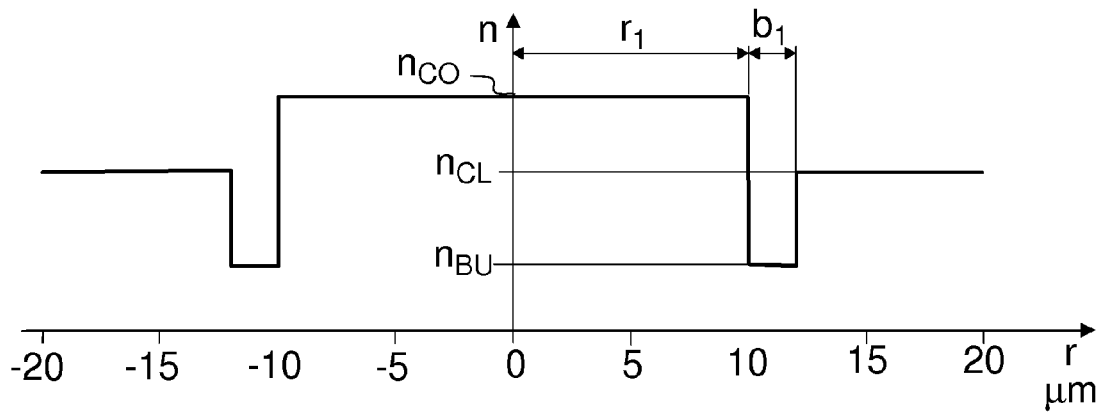
FIG. 2a shows schematically a refractive index profile of a buffered fiber.
Figure 3A:
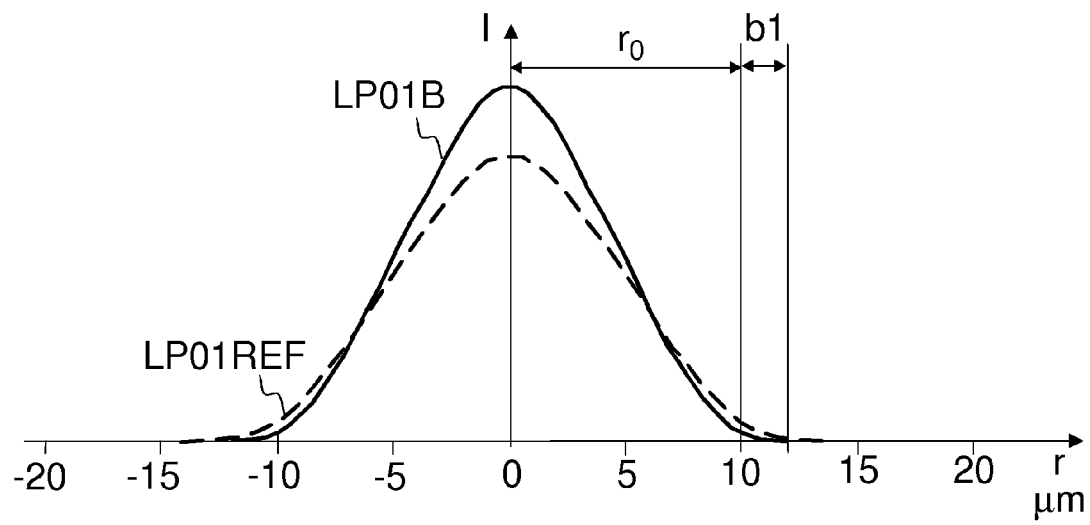
FIG. 3a shows schematically LP01 mode field distributions for the buffered fiber and for the reference fiber.
Figure 3B:
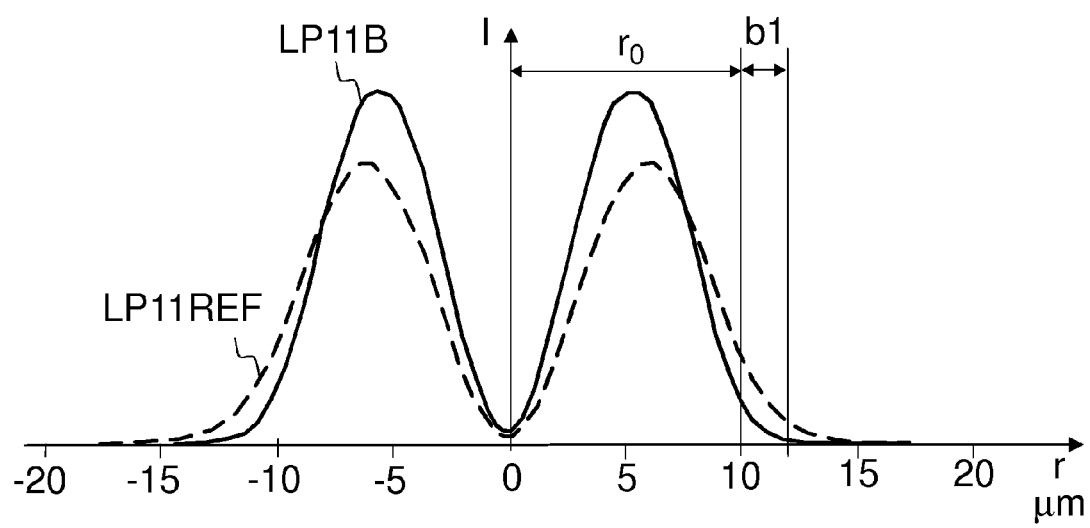
FIG. 3b shows schematically LP11 mode field distributions for the buffered fiber and for the reference fiber.
Figure 4:
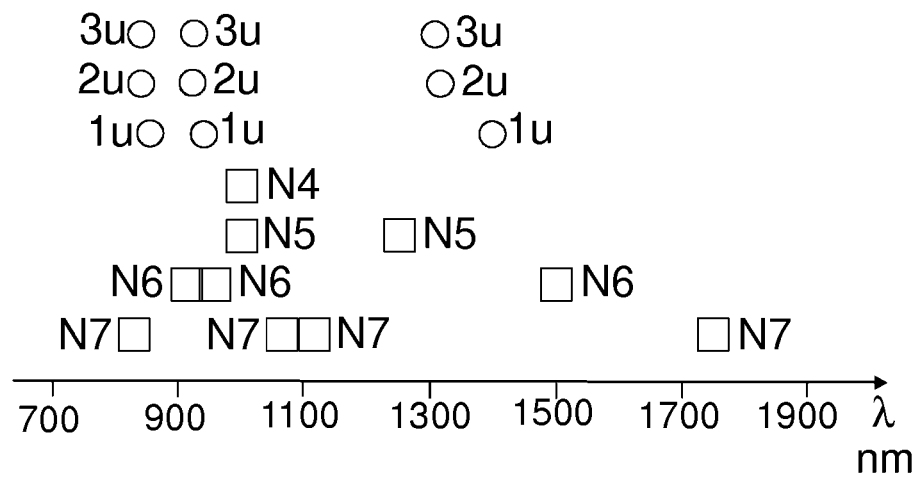
FIG. 4 shows cut-off wavelengths of high order modes for various buffered fibers and reference fibers.

FIG. 2a shows a radial refractive index profile of a buffered fiber 100, which forms the basis for mode field distributions shown in FIGS. 3a and 3b, as well as the basis for calculating the cut-off wavelengths shown in FIG. 4.

Figure 2B:
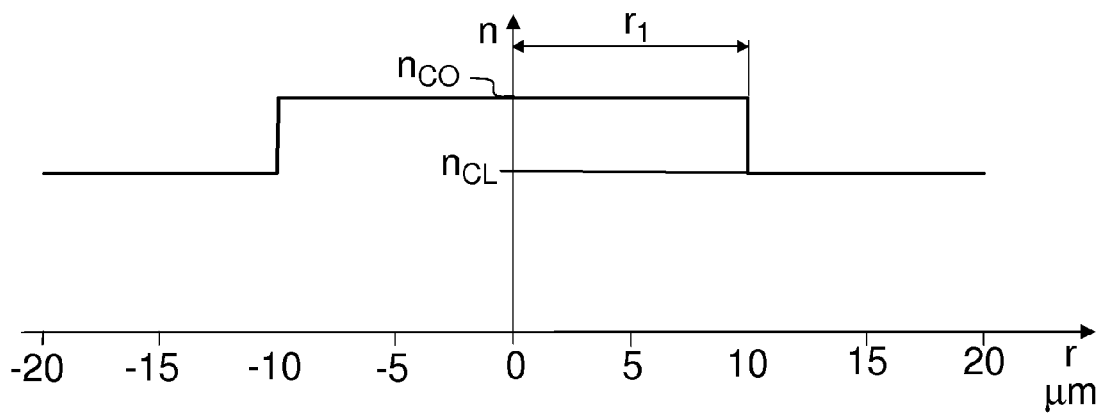
FIG. 2b shows schematically a refractive index profile of a reference fiber.

FIG. 2b shows the radial refractive index profile of a reference fiber which does not have the buffer. The reference fiber has the same core radius $r_1$ as the buffered fiber of FIG. 2a.

The solid curve LP01B in FIG. 3a shows the radial mode field distribution of the $LP_{01}$ mode in the buffered fiber of FIG. 2a. The dashed curve LP01REF shows the radial mode field distribution of the $LP_{01}$ mode in the reference fiber of FIG. 2b.

The solid curve LP11B in FIG. 3b shows the radial mode field distribution of the $LP_{11}$ mode in the buffered fiber of FIG. 2a. The dashed curve LP11REF shows the radial mode field distribution of the $LP_{11}$ mode in the reference fiber of FIG. 2b.

The fields of both modes $LP_{01}$ and $LP_{11}$ penetrate into the buffer. Thus, the equivalent refractive index difference between the core and the cladding is lower in the buffered fiber than in the reference fiber. The reduction of the equivalent refractive index difference results as a decrease in the cut-off wavelength and as a decrease in the numerical aperture NA.

The effective numerical aperture may be adjusted by selecting the radial dimension $b_1$ of the buffer, while keeping the refractive indices of the core and the cladding constant.

The radial dimension $b_1$ of the buffer BUF1 may be selected to correspond to the refractive index $n_{CO}$ of the core COR1 and/or the refractive index $n_{CL}$ of the cladding CLD1 in order to implement a desired numerical aperture NA. In other words, the numerical aperture NA may be fine-tuned by selecting the radial dimension $b_1$ of the buffer BUF1.

The mode field diameter is slightly smaller in the buffered fiber than in the reference fiber.

The round and rectangular dots in FIG. 4 show calculated cut-off wavelengths of high order modes for various fibers. $1u$ denotes a dot for a buffered fiber 100 wherein the radial dimension of the buffer is 1 μm and the equivalent numerical aperture NA is 0.055. $2u$ denotes a dot for a buffered fiber 100 wherein the radial dimension of the buffer is 2 μm and the equivalent numerical aperture NA is 0.05. $3u$ denotes a dot for a buffered fiber 100 wherein the radial dimension of the buffer is 3 μm and the equivalent numerical aperture NA is 0.05. N4 denotes a dot for a reference fiber, i.e. without a buffer, wherein the numerical aperture NA is 0.04. N5 denotes a dot for a reference fiber whose numerical aperture NA is 0.05. N6 denotes a dot for reference fiber whose numerical aperture NA is 0.06. N7 denotes a dot for a reference fiber whose numerical aperture NA is 0.07.

The calculations were made in the wavelength range 800 to 1900 nm. The calculations indicate that the presence of the buffer reduces the cut-off wavelength.

The buffered fiber having the 1 μm buffer (i.e. the radial dimension of the buffer is 1 μm) guides only two modes, whereas a corresponding reference fiber guides 4 modes.

Figure 5:
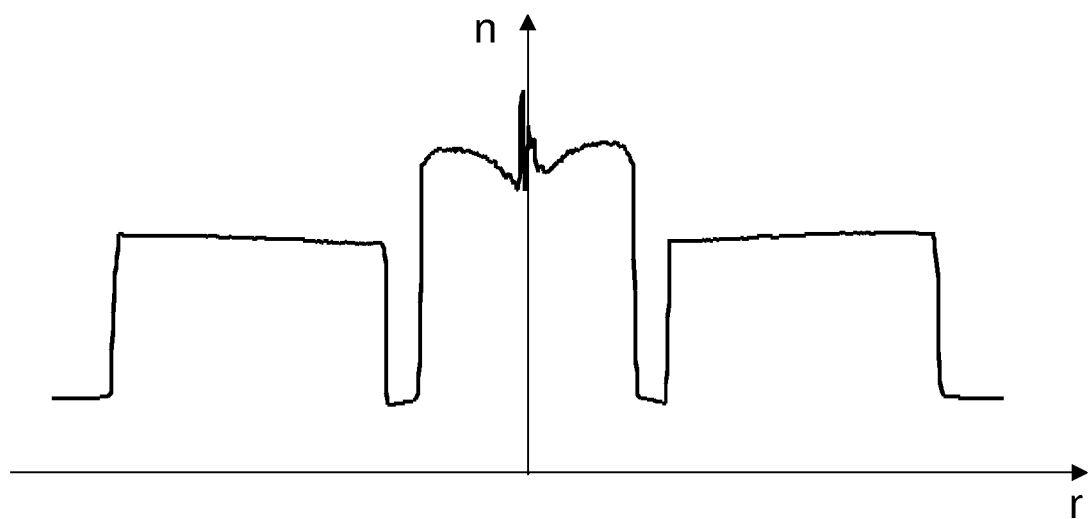
FIG. 5 shows, by way of example, a measured refractive index profile of a fiber preform manufactured by direct nanoparticle deposition.

FIG. 5 shows, by way of example, a measured radial refractive index profile for a manufactured fiber preform. A core was made by the direct nanoparticle deposition (DND). The core was covered by a pure silica tube, and the silica tube was subsequently covered with a germanium-doped glass tube.

The core COR1 may be doped with one or more light-amplifying dopants. The dopant may be e.g. a rare earth metal ion. In particular, the core may be doped with erbium, ytterbium, praseodymium or thulium. The doping may substantially contribute to the increase of the refractive index.

Figure 6:
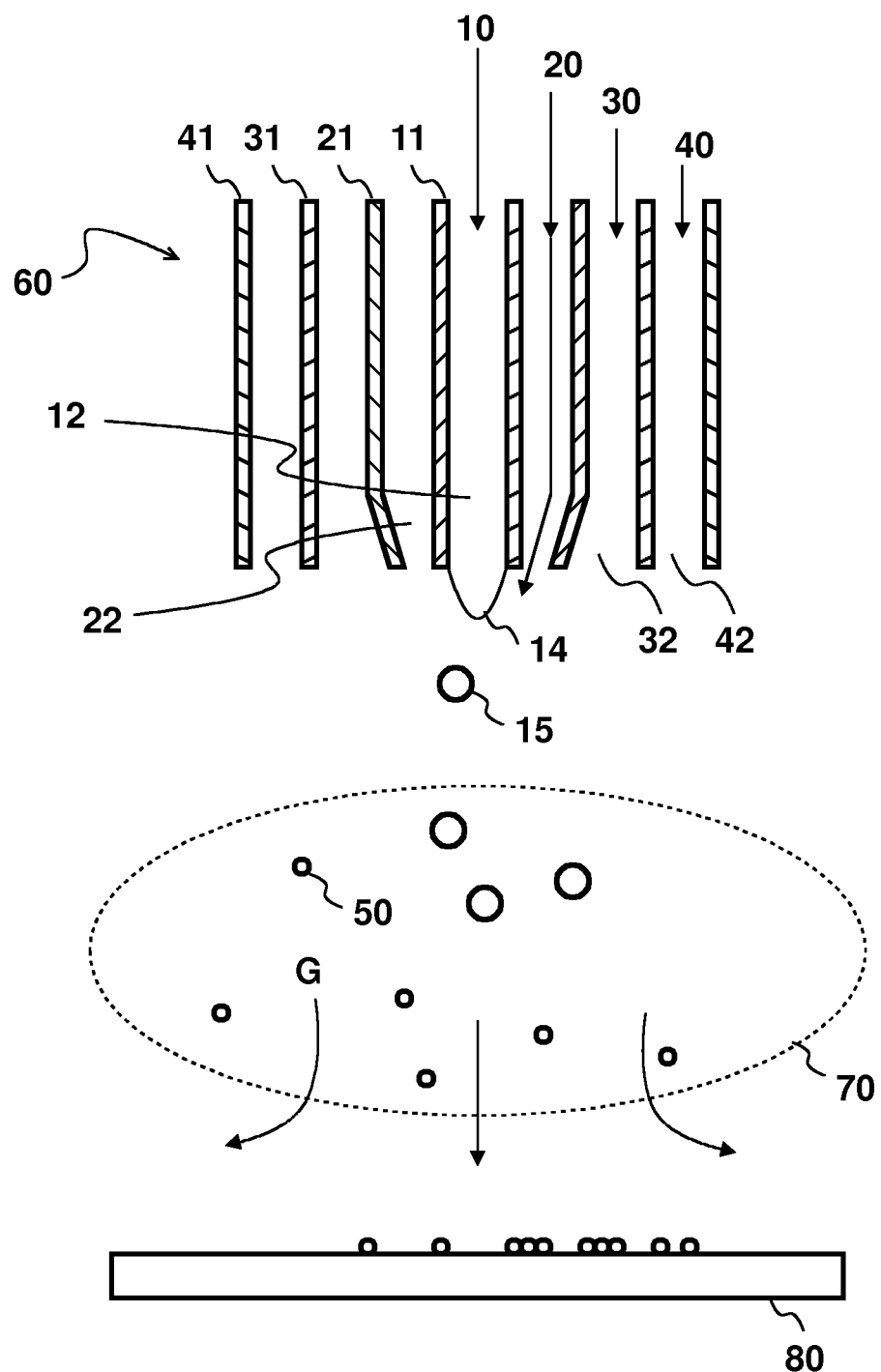
FIG. 6 shows schematically the direct nanoparticle deposition method.

Referring to FIG. 6, the material of the core COR1 may be produced, for example by the direct nanoparticle deposition (DND) method, as will be described below. The direct nanoparticle deposition method is also described in US20060001952 A1, herein incorporated by reference.

The materials of the core and/or the cladding may also be produced using modified chemical vapor deposition (MCVD), using outside vapor deposition (OVD), or using plasma chemical vapor deposition (PCVD).

The direct nanoparticle deposition method comprises at least the steps of:
  discharging atomizing gas 20,
  atomizing at least one first reactant 10 in liquid form by said atomizing gas 20 to form droplets 15,
  introducing said droplets 15 into a flame 70,
  oxidizing at least one second reactant 10 in said flame 70 to form one or more oxides,
  condensing said one or more oxides to produce particles 50,
  collecting at least a part of said particles 50 on a mandrel 80, and
  fusing said collected particles together to form light-amplifying optical material (this step is not shown in FIG. 6).

A burner assembly 60 suitable for use in the direct nanoparticle deposition method may comprise four tubes 11, 21, 31, 41, which define four concentric nozzles 12, 22, 32, 42. The innermost nozzle, herein called as the liquid nozzle, is used for delivering liquid reactant 10. The outer surface of the tube 11 and the inner surface of the tube 21 define together an annular atomizing gas nozzle 22, from which an atomizing gas 20 is discharged. The atomizing gas is accelerated by a pressure difference prevailing over the nozzle 22. The velocity of the atomizing gas 20 may be further accelerated by the constriction 24 of the nozzle 22.

There is a liquid surface 14 at the liquid nozzle 12. Shear and aerodynamic forces generated by the stream of the atomizing gas 20 tear micrometer-sized droplets 15 from the liquid surface 14 causing atomization. The droplets may be further fragmented by turbulence. The droplets are entrained within the gas jet and accelerated to a high velocity and further entrained into the flame 70.

The reactants delivered by the nozzles 12, 22, 32, 42 are mixed by turbulence and by diffusion. Exothermic reactions of the reactants, especially the oxidation of hydrogen provides the heat required for the flame 70. A high temperature is achieved. The reactants 10, 20, 30 react and oxidize in the flame 70 by producing oxides and other compounds. The saturated vapor pressures of the formed compounds are advantageously so low that they are rapidly nucleated and condensed forming nanometer-sized particles 50. The condensation is further promoted by the turbulent mixing of surrounding cool gas with the hot reaction gases, which rapidly decreases the average temperature of the gases.

The size of the produced particles 50 may be smaller than 100 nm. The produced doped glass particles are collected on a mandrel 80. Gas streams G transport the particles 50 near the surface of the mandrel 80. The final transport takes place mainly by thermoforesis.

The direct nanoparticle deposition may be used to produce e.g. erbium-doped silica. In order to produce erbium-doped silica material, the liquid reactant delivered by the nozzle 12 is advantageously erbium chloride and aluminum chloride dissolved in methanol. The atomizing gas delivered by the atomizing gas nozzle 22 is hydrogen. Silicon tetrachloride is delivered by the annular nozzle 32, and oxygen is delivered by the annular nozzle 42. The role of aluminum chloride is to increase the refractive index and to improve the solubility of erbium in the produced silica glass.

The refractive index of the produced optical material may be adjusted e.g. by changing the relative fraction of aluminum chloride in the liquid reactant 10.

The optimum combination of the flow rates of the reactants 10, 20, 30, 40, the composition of the reactants 10, 20, 30, 40, and the dimensions of the nozzles 12, 22, 32, 42 are optimized according to the predetermined target properties of the light-amplifying optical material. The preferred approach is that the optimum flow rates, compositions and dimensions are determined by an experimental procedure known by a person skilled in the art.

In order to achieve desired light-amplifying properties of the end-product, the liquid reactant 10 may comprise a compound which may comprise at least one metal selected from the groups IA, IB IIA, IIB IIIA, IIIB, IVA, IVB, VA, and the rare earth series of the periodic table of elements. Especially, the liquid reactant 10 may comprise erbium, ytterbium, neodymium and/or thulium. Silica-forming compounds may also be introduced in liquid form, for example by introducing siloxane. In some applications, one of the reactants may be clean room air. The atomizing gas 20 may be a premixed mixture of a combustible gas and an oxidizing gas, especially a premixed mixture of hydrogen and oxygen.

Light-amplifying optical waveguides made using the direct nanoparticle deposition method have been commercially available, e.g. products called as "Erbium doped fiber Er16-8/125", "Erbium doped fiber Er20-4/125", and "Erbium-doped fiber Er 30-4/125", supplied by a Finnish company Liekki Oy, on Dec. 17, 2004.

A special advantage associated with the direct nanoparticle deposition method is that a high dopant concentration may be achieved while keeping the percentage of clustered dopant ions at a low level.

Figure 7:
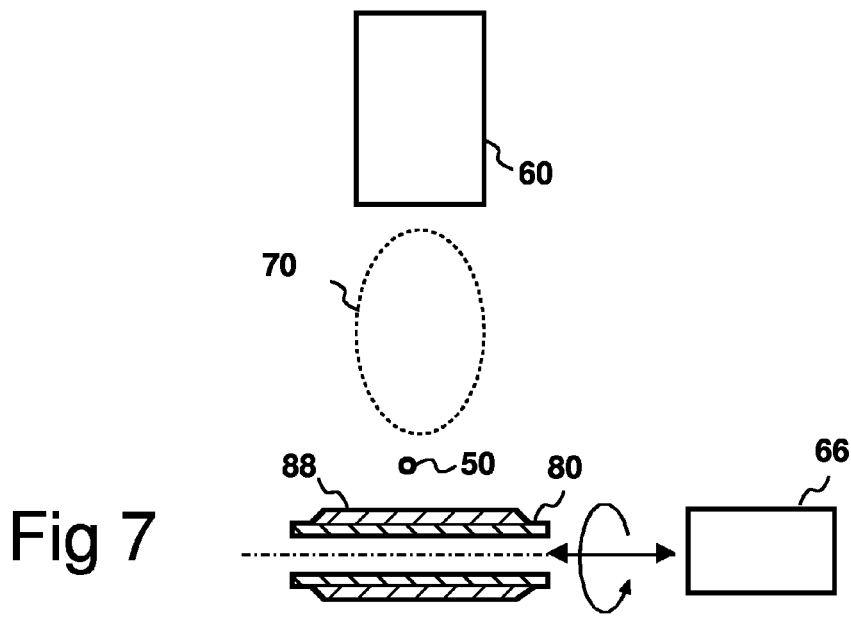
FIG. 7 shows schematically depositing optical material on a mandrel.

Referring to FIG. 7, the particles 50 of optical material may be deposited on a rotating mandrel 80 to form a tubular agglomerate 88. The mandel 80 is rotated by the rotation mechanism 66. The mandel 80 and/or the burner assembly 60 may be moved in the longitudinal direction. The deposition system may comprise apparatus for monitoring the thickness of the tubular agglomerate 88 and for controlling the chemical composition of the produced material as a function of said thickness.

After the deposition step, the tubular agglomerate 88 may be removed from the mandrel 80. The tubular agglomerate 88 may be subsequently inserted into a furnace (not shown) for purification and sintering, using methods known by the person skilled in the art. Subsequently, the agglomerate 88 may be collapsed to form a rod 91 (see FIG. 8) of doped silica glass, using methods known by the person skilled in the art.

A preform 90 for manufacturing a buffered fiber 100 may comprise:
- a rod 91 having a refractive index $n_{CO}$,
- a first glass tube having a refractive index $n_{BU}$ which is substantially equal to the refractive index of pure amorphous silica, and
- a second glass tube having a refractive index $n_{CL}$ which is higher than $n_{BU}$.

Figure 8:
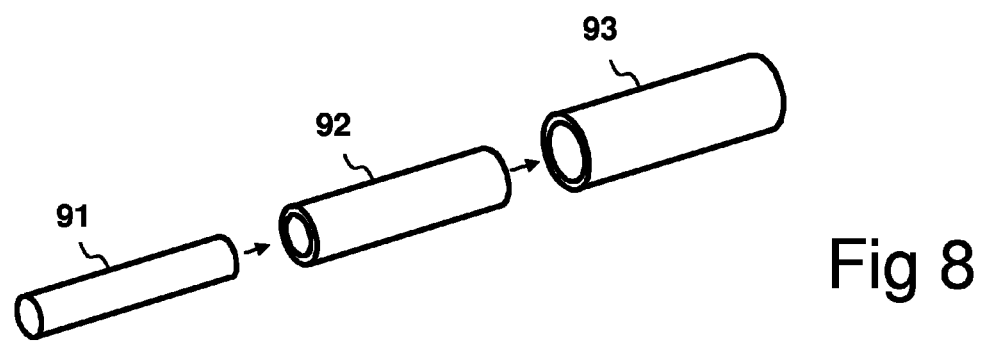
FIG. 8 shows, in a three dimensional schematic view, combining of a rod, a first tube and a second tube to form a fiber perform.
Figure 9:
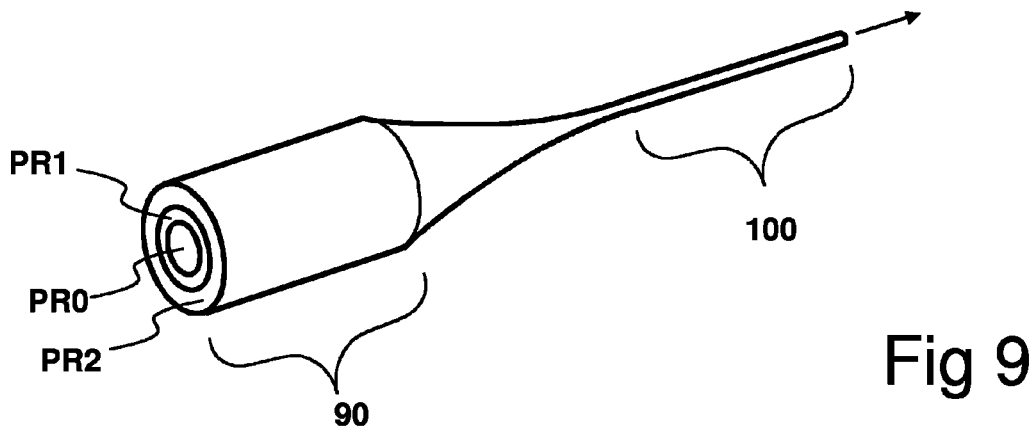
FIG. 9 shows, in a three dimensional schematic view, drawing of the light-amplifying buffered fiber from the perform.

Referring to FIG. 8, the rod 91 is combined with a first glass tube 92 and a second glass tube 93 to form a fiber preform 90 (see FIG. 9). The rod 91 and the tubes are positioned inside each other and fused together using so-called sleeving techniques known by the person skilled in the art. The refractive index of the first tube 92 is equal to the refractive index of pure silica glass. The refractive index of the second tube 93 is greater than the refractive index of the first tube 92.

Referring to FIG. 9, the fiber preform 90 is heated and drawn to form the light-amplifying optical fiber 100, using methods known by the person skilled in the art. The form of the radial refractive index profile is substantially preserved in the drawing process. Thus, the fiber 100 having the predetermined refractive index profile may be drawn from the preform 90 which has a profile of the same form. The core region PR0 of the preform 90 consists of the material of the rod 91 (FIG. 8). The buffer region PR1 of the preform 90 consists of the material of the first tube 92. The cladding region PR2 of the preform 90 consists of the material of the second tube 93. The core COR1 of the fiber 100 consists of the material of the core region PR0 of the preform 90. The material of the buffer BUF1 of the fiber 100 consists of the material of the first cladding region PR1 of the preform 90. The material of the cladding CLD1 of the fiber 100 consists of the material of the second cladding region PR2 of the preform 90.

Referring back to FIG. 7, the glass materials corresponding to the buffer BUF1 and to the cladding CLD1 may also be deposited directly over the agglomerate 88. The thickness of the collected deposit may be monitored and the composition of the produced particles 50 may be changed during the deposition process such that the agglomerate will have a refractive index profile which corresponds to the predetermined refractive index profile of the fiber 100.

Thus, a method for producing the preform 90 of an optical waveguide 100 may comprise:
- providing a rod 91,
- coating said rod 91 with a first glass layer 92 such that said first glass layer 92 surrounds said rod 91, and
- coating said first glass layer 92 with a second glass layer 93 such that said second glass layer 93 surrounds said first glass layer 92.

The rod 91, the first glass layer 92, and the second glass layer 93 may comprise silica glass. The refractive index of the first glass layer 92 may be substantially equal to the refractive index of pure amorphous silica glass. In particular, the first glass layer 92 may consist of pure silica glass. The material of the rod 91 may be doped with at least one light-amplifying dopant.

The first glass layer 92 may be produced directly on the rod 91 (i.e. on an agglomerate 88) by using the direct nanoparticle deposition. Sintering and collapsing of the preform 90 may be performed after the first glass layer 92 has been deposited on the rod 91.

A free-standing heated rod 91 may be deformed when heated. For example the cross-section of the rod 91 may be deformed from a substantially circular shape to an elliptical shape.

Deformation of the geometrical shape of the rod 91 during sintering and/or collapsing may be substantially reduced if the first glass layer 92 has been deposited on the rod 91 (agglomerate 88) before sintering and collapsing. The first layer 92 of substantially pure silica glass has typically a higher glass transition temperature ("softening point") than the doped material of the rod 91. Thus, the heated combination of the rod 91 and the first glass layer 92 is typically more rigid than a free-standing rod 91 which has been heated to the same temperature.

The second glass layer 93 may be provided e.g. by fusing a glass tube 93 to the first layer 92 such that the glass tube 93 surrounds the first layer 92. Alternatively, the second glass layer 93 may be provided e.g. by direct nanoparticle deposition (DND).

The fiber 100 according to the present invention may comprise further layers (not shown) surrounding the cladding CLD1 to provide e.g. mechanical and chemical protection, strain relief, and/or blocking of stray light.

The cladding CLD1 may be further doped with substances, e.g. $TiO_2$, $P_2O_5$ or $B_2O_3$, which makes the fusing of the fiber to another silica-based fiber easier.

The fiber 100 may be used to implement e.g. an optical amplifier.

The fiber 100 may be optimized to achieve low bending losses, i.e. to minimize the loss of light in bent sections of the fiber 100.

The fiber 100 may be designed to provide a low dispersion over a wide and predetermined wavelength range.

The fiber 100 may be a dispersion-shifted fiber, i.e. it may be designed to provide a zero-dispersion property at a predetermined wavelength, which predetermined wavelength is shifted with respect to the zero-dispersion wavelength of a reference fiber without the buffer.

The fiber 100 according to the present invention may be designed to act as a short-pass filter, i.e. to attenuate light which has a wavelength greater than a predetermined value.

The radius r1 of the core of the waveguide 100 may be greater than or equal to 3 µm.

The ratio of the radial dimension b1 of the buffer BUF1 to the radius r1 of the core COR1 may be e.g. in the range of 0.05 to 0.4.

The numerical aperture of the waveguide 100 may be tuned by adjusting the radial dimension of the buffer BUF1 so as to attain a predetermined numerical aperture.

Said adjustment may be performed according to the refractive index $n_{CO}$ of the core COR1 and according to the refractive index $n_{CL}$ of the cladding CLD1.

The difference between the predetermined numerical aperture and the attained numerical aperture may be e.g. smaller than or equal to 0.005, preferably smaller than or equal to 0.002.

Variations in the refractive indices $n_{CO}$ and $n_{CL}$ may be compensated by adjusting the radial dimension b1 of the buffer BUF1.

Multimode fibers having a large mode area (LMA) have a relatively low numerical aperture. The numerical aperture of the optical waveguide 100 may be e.g. in the range of 0.05 to 0.08. Implementation of such a low numerical aperture typically requires accurate control of the refractive index of the core COR1 and the cladding CLD1. Thanks to the invention, larger variations in the refractive indices may now be allowed. The effect of the variations in the refractive indices on the numerical aperture may be compensated by adjusting the radial dimension B1 of the buffer BUF1. Consequently, the manufacturing yield may be increased.

For example, a waveguide 100 having a numerical aperture of 0.070 may be manufactured (without the buffer) by using a core material which has a refractive index 1.4620 and cladding material which has a refractive index of 1.4603. If the refractive index of the doped core material would be e.g. 1.4615, the corresponding numerical aperture would be 0.060 (without buffer). Thus, the deviation of 0.0005 in the refractive index of the core may be sufficient to cause a deviation of 0.010 between the attained numerical value 0.060 and the predetermined numerical aperture 0.070. The difference 0.010 corresponds to 14% deviation when compared with the predetermined target value 0.070. This deviation may be compensated by adjusting the radial dimension B1 of the buffer BUF1 in order to attain the predetermined numerical aperture 0.070.

The numerical aperture of the waveguide 100 may be tuned by adjusting the radial dimension of the buffer BUF1 when the refractive index $n_{BU}$ of the buffer BUF1 is smaller than the refractive index $n_{CL}$ of the cladding CLD1. In particular, the numerical aperture of the waveguide 100 may be tuned by adjusting the radial dimension of the buffer BUF1 when the refractive index $n_{BU}$ of the buffer BUF1 is smaller than the refractive index $n_{CL}$ of pure amorphous silica, i.e. when the also buffer BUF1 has been doped.

However, precise controlling of the refractive index is more difficult if the refractive index of the buffer BUF1 has been modified by doping, when compared with a situation when the refractive index of the buffer BUF1 is substantially equal to the refractive index of pure amorphous silica.

Furthermore, embodiments with pure silica buffer are less susceptible to bubble formation than embodiments with a doped buffer.

The waveguide 100 may be drawn from the preform 90. The ratio of the radial dimension of the first glass tube 92 to the radius of the rod 91 may be selected according to the refractive index $n_{CO}$ of the rod and the refractive index $n_{CL}$ of the second glass tube already when making the preform 90. Said ratio may be selected such that a predetermined numerical aperture and/or a predetermined cut-off wavelength $\lambda_C$ of single mode operation may be attained when a waveguide 100 having a predetermined core radius r1 is drawn from said preform 90.

The waveguide 100 may be drawn from the preform 90. The ratio of the radial dimension of the first glass layer 92 to the radius of the rod 91 (agglomerate 88) may be selected according to the refractive index $n_{CO}$ of the rod and the refractive index $n_{CL}$ of the second glass layer already when making the preform 90. Said ratio may be selected such that a predetermined numerical aperture and/or a predetermined cut-off wavelength $\lambda_C$ of single mode operation may be attained when a waveguide 100 having a predetermined core radius r1 is drawn from said preform 90.

The refractive indices, the numerical aperture, and the mode area may be determined at a predetermined wavelength of light, e.g. at λ=1000 nm (in vacuum).

An increase of the radial dimension b1 of the buffer BUF1 may decrease the cut-off wavelength $\lambda_C$ of the waveguide 100 (see FIG. 4). An equivalent numerical aperture $NA_{eq}$ of the waveguide 100 may be calculated from the cut-off wavelength $\lambda_C$ by using equation (1):

$$NA_{eq} = \frac{2.405\lambda_c}{2\pi r_1} \quad (1)$$

where $NA_{eq}$ denotes effective numerical aperture, $\lambda_C$ denotes cut-off wavelength (in vacuum), and $r_1$ denotes the radius of the core COR1. $\lambda_C$ is the cut-off wavelength for single mode operation, i.e. only single mode operation is possible when the wavelength is shorter than or equal to the cut-off wavelength $\lambda_C$.

The tails of mode field distributions of the higher order modes may extend through the buffer BUF1 deeper into the cladding CLD1 than the tail of mode field distribution of the $LP_{01}$ mode (see FIGS. 3a and 3b). This effect may be controlled by adjusting the radial dimension b1 of the buffer BUF1. It may even be so that the tail of the $LP_{01}$ mode does not penetrate through the buffer BUF1 although the tails of the mode field distributions of the higher order modes penetrate through the buffer BUF1. Thus, the tails of the mode field distributions of the higher order modes may interact with a lower refractive index difference than the tail of the $LP_{01}$ mode. Consequently, for wavelengths shorter than or equal to $\lambda_C$, the $LP_{01}$ mode may still be confined to the waveguide 100 while the higher order modes are not supported by waveguide 100.

The maximum radial dimension b1 of the buffer BUF1 may be limited e.g. to the maximum distance of mode penetration from the boundary of the core COR1. The tail of the mode field of the $LP_{01}$ mode may be considered to extend up to a penetration radius where $10^{-10}$ of the energy of the $LP_{01}$ mode is carried outside said penetration radius. The maximum radial dimension b1 of the buffer BUF1 may be limited so that the buffer does not extend beyond said penetration radius. The maximum radial dimension b1 of the buffer BUF1 may be e.g. 5 μm.

A predetermined cut-off wavelength $\lambda_C$ may be implemented for the waveguide 100 by selecting the radial dimension b1 of the buffer BUF1 according to the refractive index $n_{CO}$ of the core COR1 and the refractive index $n_{CL}$ of the cladding CLD1. In other words, the radial dimension b1 of the buffer BUF1 may be adjusted so as to tune the cut-off wavelength $\lambda_C$ of said optical waveguide 100 to a predetermined target value It may be deduced from eq. (1) that an increase of the radial dimension b1 of the buffer BUF1 may decrease the equivalent numerical aperture $NA_{eq}$ of the waveguide 100.

The equivalent numerical aperture $NA_{eq}$ of the waveguide 100 may be adjusted by adjusting the radial dimension b1 of the buffer BUF1. Thus, a method for producing an optical waveguide may comprise adjusting the radial dimension b1 of the buffer BUF1 so as to attain a predetermined equivalent numerical aperture $NA_{eq}$ of said optical waveguide 100.

The radial dimension b1 of the buffer BUF1 may be adjusted e.g. by selecting the ratio of the radial dimension b1 to the radius r1 of the core COR1 of the waveguide 100 in the preform or deposition stage, and drawing the waveguide 100 from the preform so as to attain a predetermined core radius r1.

The radial dimension b1 may also be fine-tuned in the fiber drawing phase by allowing small variations in the total diameter of the drawn waveguide 100.

For a person skilled in the art, it will be clear that modifications and variations of the fiber according to the present invention, the fiber preform according to the present invention, the method of manufacturing said fiber and the method of manufacturing said preform are perceivable. The particular embodiments described above with reference to the accompanying drawings are illustrative only and not meant to limit the scope of the invention.

What is claimed is:

1. An optical waveguide, comprising:
a core doped with at least one light-amplifying dopant;
a buffer surrounding said core; and
a cladding surrounding said buffer,
wherein said core, said buffer, and said cladding comprise silica glass, wherein a refractive index of said buffer is substantially equal to a refractive index of pure amorphous silica glass, wherein a refractive index of said cladding is greater than the refractive index of said buffer, wherein a ratio of a radial dimension of said buffer to a radius of said core is in a range of 0.05 to 0.4, and wherein an effective mode area of said waveguide is greater than or equal to 200 μm².

2. The optical waveguide according to claim 1, wherein the radius of said core is greater than or equal to 3 μm.

3. The optical waveguide according to claim 1, wherein a numerical aperture of said optical waveguide is in a range of 0.05 to 0.08.

4. The optical waveguide according to claim 3, wherein the numerical aperture of said optical waveguide is in the range of 0.05 to 0.065.

5. The optical waveguide according to claim 1, wherein the radial dimension of the buffer is smaller than or equal to 5 μm.

6. A method for producing an optical waveguide, said optical waveguide comprising:
a core doped with at least one light-amplifying dopant,
a buffer surrounding said core, and
a cladding surrounding said buffer,
wherein said core, said buffer, and said cladding comprise silica glass, wherein a refractive index of said buffer is substantially equal to a refractive index of pure amorphous silica glass, wherein a refractive index of said cladding is greater than the refractive index of said buffer, wherein a ratio of a radial dimension of said buffer to a radius of said core is in a range of 0.05 to 0.4, and wherein an effective mode area of said waveguide is greater than or equal to 200 μm²,
said method comprising:
adjusting the radial dimension of said buffer so as to tune a cut-off wavelength of single mode operation of said optical waveguide to a predetermined value.

7. The method according to claim 6, wherein the radial dimension of said buffer is adjusted according to a refractive index of said core and according to the refractive index of said cladding.

8. The method according to claim 6, wherein the radial dimension of said buffer is adjusted such that a difference between a predetermined numerical aperture and an attained numerical aperture is smaller than or equal to 0.005.

9. The method according to claim 6, further comprising:
providing a predetermined radius of said core.

10. The method according to claim 9, wherein the radial dimension of said buffer is selected to correspond to a refractive index of said core and/or to the refractive index of said cladding so as to compensate for variations in the refractive index of said core and/or in the refractive index of said cladding.

11. A method for producing an optical waveguide, said optical waveguide comprising
a core doped with at least one light-amplifying dopant,
a buffer surrounding said core, and
a cladding surrounding said buffer,
wherein said core, said buffer, and said cladding comprise silica glass, and a refractive index of said buffer is smaller than or equal to a refractive index of pure amorphous silica glass, a refractive index of said cladding is greater than the refractive index of said buffer, a ratio of a radial dimension of said buffer to a radius of said core is in a range of 0.05 to 0.4, and an effective mode area of said waveguide is greater than or equal to 200 μm²,
said method comprising:
adjusting the radial dimension of said buffer so as to tune a cut-off wavelength of single mode operation of said optical waveguide to a predetermined value.

12. The method according to claim 11, wherein the radial dimension of said buffer is adjusted according to a refractive index of said core and according to the refractive index of said cladding.

13. The method according to claim 11, wherein the radial dimension of said buffer is adjusted such that the difference between a predetermined numerical aperture and an attained numerical aperture is smaller than or equal to 0.005.

14. The method according to claim 11, further comprising:
providing a predetermined radius of said core.

15. The method according to claim 11, wherein the radial dimension of said buffer is selected to correspond to the refractive index of said core and/or to the refractive index of said cladding so as to compensate for variations in the refractive index of said core and/or in the refractive index of said cladding.

16. A light-amplifying optical waveguide, comprising:
a core doped with at least one light-amplifying dopant;
a buffer surrounding said core; and
a cladding surrounding said buffer,
wherein said core, said buffer, and said cladding comprise silica glass, wherein a refractive index of said buffer is substantially equal to a refractive index of pure amorphous silica glass, wherein a refractive index of said cladding is greater than the refractive index of said buffer, wherein a ratio of a radial dimension of said buffer to a radius of said core is in a range of 0.05 to 0.4, and wherein an effective mode area of said waveguide is greater than or equal to 200 $\mu m^2$.

17. The optical waveguide according to claim 16, wherein the radius of said core is greater than or equal to 3 $\mu m$.

18. The optical waveguide according to claim 16, wherein a numerical aperture of said optical waveguide is in a range of 0.05 to 0.08.

19. The optical waveguide according to claim 16, wherein a numerical aperture of said optical waveguide is in a range of 0.05 to 0.065.

20. The optical waveguide according to claim 16, wherein the radial dimension of the buffer is smaller than or equal to 5 $\mu m$.

21. A method for producing an optical waveguide, said optical waveguide comprising
a core doped with at least one light-amplifying dopant,
buffer surrounding said core, and
a cladding surrounding said buffer,
wherein said core, said buffer, and said cladding comprise silica glass, and a refractive index of said buffer is substantially equal to a refractive index of pure amorphous silica glass, a refractive index of said cladding is greater than the refractive index of said buffer, a ratio of a radial dimension of said buffer to a radius of said core is in the range of 0.05 to 0.4, and an effective mode area of said waveguide is greater than or equal to 200 $\mu m^2$,
said method comprising:
adjusting the radial dimension of said buffer so as to attain a predetermined numerical aperture of said optical waveguide.

22. A method for producing an optical waveguide, said optical waveguide comprising
a core doped with at least one light-amplifying dopant,
a buffer surrounding said core, and
a cladding surrounding said buffer,
wherein said core, said buffer, and said cladding comprise silica glass, and a refractive index of said buffer is smaller than or equal to a refractive index of pure amorphous silica glass, a refractive index of said cladding is greater than the refractive index of said buffer, the ratio of a radial dimension of said buffer to a radius of said core is in a range of 0.05 to 0.4, and an effective mode area of said waveguide is greater than or equal to 200 $\mu m^2$,
said method comprising:
adjusting the radial dimension of said buffer so as to attain a predetermined numerical aperture of said optical waveguide.

23. The method according to claim 22, further comprising:
providing a rod doped with at least one light-amplifying dopant;
sintering the rod after the rod has been coated with a first glass layer comprising substantially pure silica glass;
forming a perform comprising the rod, the first glass layer, and a second glass layer; and
drawing the optical waveguide from the preform.

24. The method according to claim 22, further comprising:
providing a rod doped with at least one light-amplifying dopant;
selecting the radial dimension of a first glass layer to the radius of the rod according to the refractive index of the rod, wherein the first glass layer comprises substantially pure silica glass;
forming a perform comprising the rod and the first glass layer; and
drawing the optical waveguide from the preform.

* * * * *